United States Patent
Schreiner

[15] 3,703,993
[45] Nov. 28, 1972

[54] SPRINKLER DEFLECTOR

[72] Inventor: James W. Schreiner, 2439 Markham Avenue, Thousand Oaks, Calif. 91360

[22] Filed: Sept. 23, 1970

[21] Appl. No.: 74,580

[52] U.S. Cl. ................239/231, 239/276, 239/498
[51] Int. Cl. .............................................B05b 3/08
[58] Field of Search ......116/114; 239/276, 231, 232, 239/279, 273, 275, 285, 498

[56] References Cited

UNITED STATES PATENTS

| | | | |
|---|---|---|---|
| 2,530,779 | 11/1950 | Owbridge | 239/231 |
| 3,095,148 | 6/1963 | Smith | 239/276 X |
| 3,387,785 | 6/1968 | Jaggers | 239/273 X |
| 2,954,934 | 10/1960 | Hatanaka | 239/231 |
| 3,361,364 | 1/1968 | Purtell | 239/288.5 |

FOREIGN PATENTS OR APPLICATIONS

| | | | |
|---|---|---|---|
| 653,663 | 12/1962 | Canada | 239/276 |
| 1,075,887 | 2/1960 | Germany | 239/276 |

Primary Examiner—Richard A. Schacher
Assistant Examiner—John J. Love
Attorney—Jessup & Beecher

[57] ABSTRACT

The disclosed apparatus relates to lawn-watering equipment, and more particularly relates to a device for producing a watering pattern that can be made to conform to the shape and size of a lawn portion that is bordered by walks, parking areas, buildings, and the like that should not be wetted. Moreover, the disclosed device can be removed and then reinstalled and oriented so that the conformed watering pattern again matches the layout of the lawn portion.

6 Claims, 10 Drawing Figures

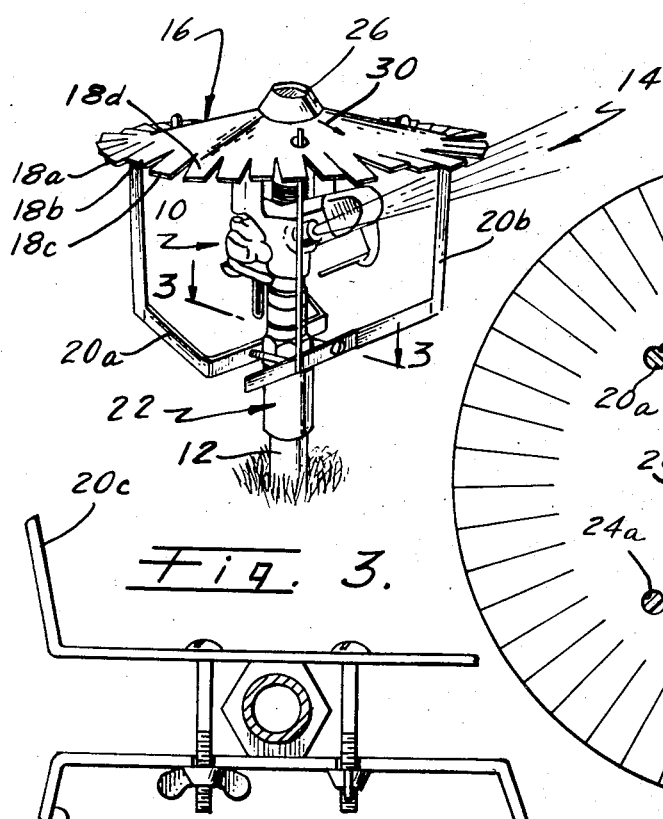
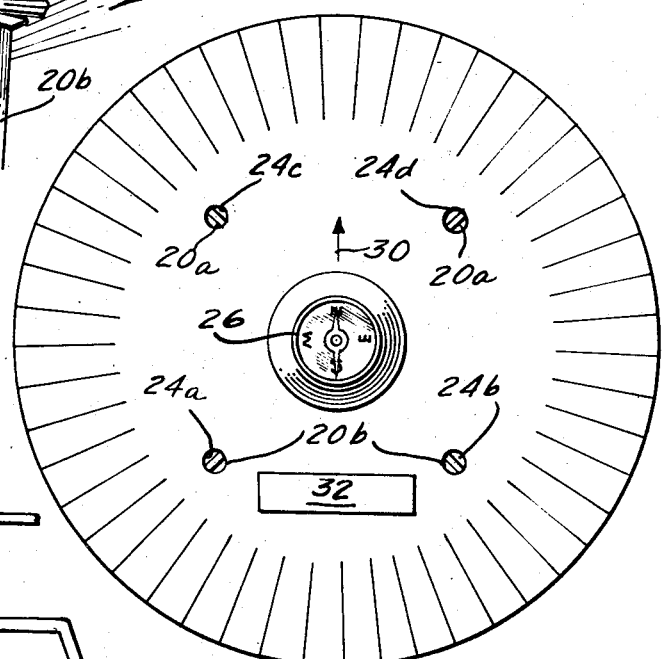
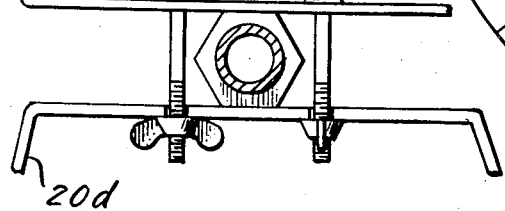
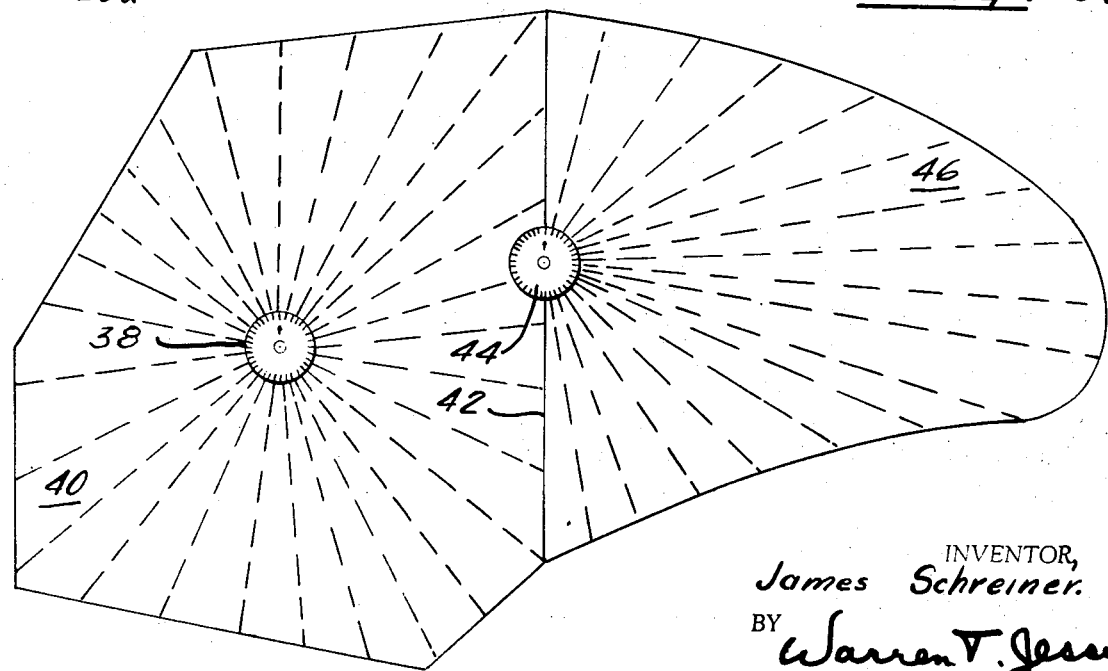

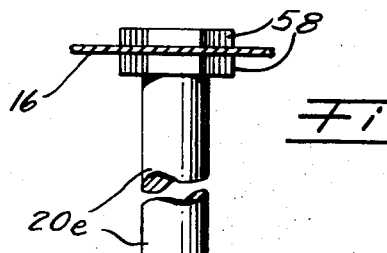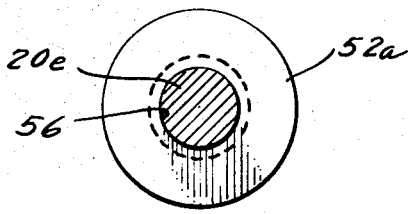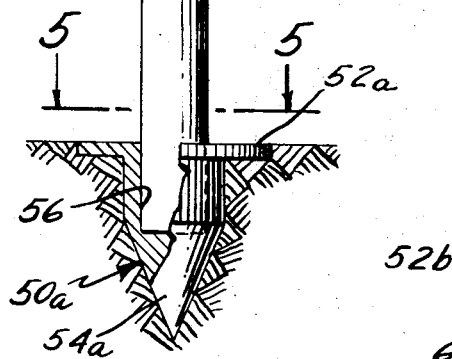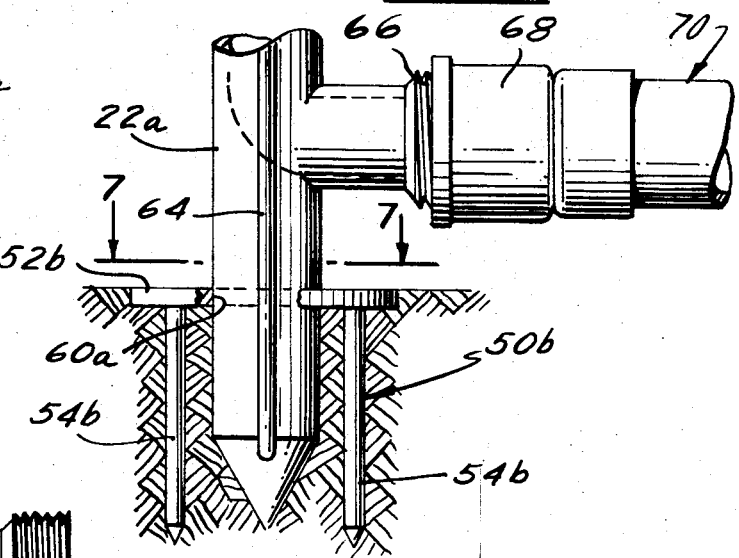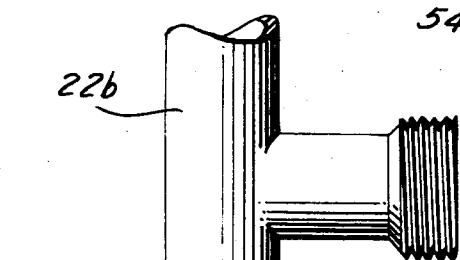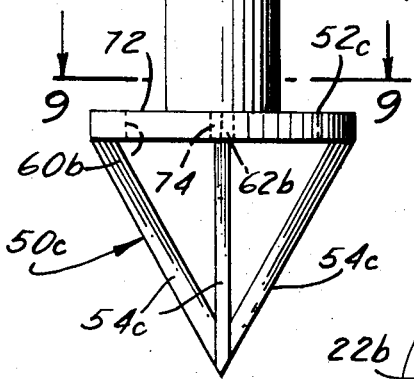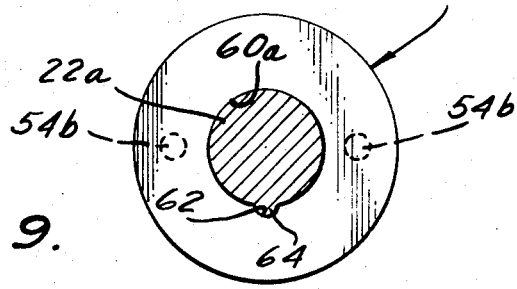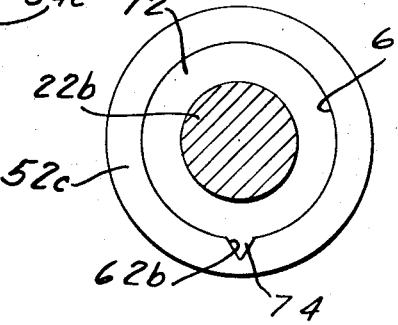

SPRINKLER DEFLECTOR

BACKGROUND OF THE INVENTION

Good lawn care depends, to a great extent, upon proper lawn watering, but unfortunately, most lawn-watering devices have circular or square watering patterns, so that their use tends to over-saturate certain portions of the lawn, while often simultaneously failing to water the lawn's more distant corners. An additional, and possibly more serious, problem of the prior art watering devices arises when they are used in locations, such as parks, etc., where the lawns are bordered by walks, parking areas, buildings, or the like, that should not be watered for fear of wetting pedestrians, automobiles, etc.

OBJECTS AND DRAWINGS

It is the principal object of this invention to provide an improved lawn-watering device.

It is another object of this invention to provide an improved lawn-watering device, particularly adapted to water lawns that are bordered or free-form in shape.

It is still another object of this invention to provide an improved lawn-watering device adapted to minimize over-saturation of portions of the lawn.

It is a further object of this invention to provide an improved lawn-watering device adapted to be used with non-permanent water pipes.

It is a still further object of this invention to provide an improved lawn-watering device that is simple and is economical to manufacture.

BRIEF DESCRIPTION OF THE DRAWINGS

The attainment of these objects and others will be realized from a study of the following detailed description, taken in conjunction with the drawings.

FIG. 1 is a pictorial representation of this invention;

FIG. 2 is a partial view of the mounting bracket and its fastening;

FIG. 3 is a top view of the water deflector;

FIG. 4 is a view of a locating device for orienting the watering apparatus and/or the water deflector;

FIG. 5 is a cross-sectional view of the arrangement of FIG. 4;

FIG. 6 is a view of another locating device;

FIG. 7 is a cross-sectional view of the arrangement of FIG. 6;

FIG. 8 is a view of still another locating device;

FIG. 9 is a cross-sectional view of the arrangement of FIG. 8; and

FIG. 10 is a schematic view of a composite watering pattern obtainable by the use of this invention.

SYNOPSIS

Broadly speaking, the disclosed apparatus is a lawn-watering device having a hat-like water deflector whose periphery is formed into radially extending fingers, the deflector being mounted above the water sprinkler in such a way that the peripheral fingers may be bent to control the range of the water spray in selected directions. In this way the watering pattern is conformed to the shape and size of the lawn. An index mark and the needle of a magnetic compass are aligned, so that at each use the conformed watering pattern is automatically rematched to the layout of the lawn.

Alternatively, the watering pattern may be rematched to the layout of the lawn by the use of a locating device.

INTRODUCTION

A myriad of lawn-watering devices or sprinklers are presently available. Their very number and variety indicates that none of them really solves the problem of proper lawn watering. The available sprinklers take innumerable forms, utilizing primarily circular sprays, shaped sprays, rotating arms and rotating jets of water. The latter type is most widely used for watering large lawns, since the single jet of water is able to reach a relatively long distance. A rotating mechanism sequentially aims the single jet of water in slightly different directions, thus watering a relatively large circular area. By properly setting the rotation control, the single jet may be caused to "nod" rather than to rotate continuously, in this way watering an adjustable-sized, pie-shaped sector of a circle.

DETAILED DESCRIPTION OF THE ILLUSTRATED EMBODIMENT

In FIG. 1, a watering device 10, illustrated as being of the single-jet type, is shown connected to a permanently installed embedded water pipe 12 to produce a water jet 14 that may be rotated as discussed above to produce a water spray. Positioned closely above the watering device is a water deflector 16 having a conical shape that provides desired strength against being deformed, for example, when it is bumped by a lawnmower. The conical shape also accommodates the upper portion of the central stem of device 10, thereby obviating the need to form a central aperture through which the stem could project.

The periphery of deflector 16 is formed into a plurality of closely spaced, radially extending fingers 18a, 18b, 18c, etc., that may be bent upward or downward to selectively interfere with the water spray and to thus control the angle, spread and range of the water jet in specific directions. In this way, the range of the water jet at each particular orientation may be adjusted to provide either a maximum watering distance or a lesser watering distance, thus establishing a watering pattern that may be conformed to the shape and size of the lawn or lawn portion that is to be watered.

In order to maximize the shaping effect, and to minimize the loss of water, the fingers 18 are preferably formed by slitting or shearing, rather than by sawing, which would produce a "kerf" or space between adjacent fingers.

In order to mount deflector 16 in proper relation to the sprinkler 10, one or more mounting brackets 20a, 20b, are fastened to the sprinkler or to a convenient portion of the water pipe. These mounting brackets are shown to be made of sheet metal and to have at their distal ends small holding notches that engage a plurality of symmetrically positioned mounting apertures 24a, etc. of deflector 16. Thus, the deflector 16 is readily positionable and held, but may be easily removed if desired to protect it from loss. Alternatively, the mounting brackets 20 may terminate in a threaded portion and the deflector may then be mounted in a more or less semi-permanent manner by means of nuts and bolts. Welding, brazing, etc. may be used for a permanent mounting.

FIG. 1 illustrates the mounting brackets 20a, 20b to be fastened to the hexagonal portion of the sprinkler housing 22 that is used to screw the sprinkler to the water pipe 12, the mounting brackets being fastened by a combination of bolts and nuts. Alternatively, as shown in FIG. 2, the mounting brackets 20c and 20d may be fastened by a quick engagement/disengagement arrangement such as slotted brackets and a combination of bolts and wing nuts.

In the foregoing discussion, the water pipe 12 was shown to be permanently installed by being embedded into the ground; however, in many cases a permanent implantation of water pipes is undesirable because of costs, mowing problems, vandalism and the like. Therefore, in many cases watering is accomplished by the use of a flexible garden hose, the end of the hose and its attached sprinkler being moved to the various portions of the lawn to be watered. This procedure, unfortunately, introduces the problem of repeatedly conforming the watering pattern to the various shapes of the lawn portions, and this problem becomes progressively worse in the case of free-form lawns or those that are bordered with pedestrian walks.

This invention solves this problem as follows:

Referring back to FIG. 1, it will be seen that a small magnetic compass 26 is mounted at the external apex of deflector 16, this being better shown in the top view of FIG. 3. This drawing also shows that deflector 16 bears thereon an indexing mark, such as arrow 30.

The method of use is as follows. The disclosed deflector and a sprinkler of the desired type are attached to the end of the garden hose, and the deflector/sprinkler watering apparatus is then positioned at the desired location. The needle of the magnetic compass 26 will, of course, point approximately northward, although it may be slightly affected by the presence of adjacent magnetic materials in fences, automobiles, etc. But primarily because of the distance of these materials from the magnetic compass, the disturbing effect will be insignificant. It will be realized that the magnetic effect of the mounting brackets is also insignificant, because the mounting brackets are symmetrically positioned around the magnetic compass, so that even if the mounting brackets were made of magnetic material, the symmetry will cancel out any magnetic effect. Moreover, since the mounting brackets are continually exposed to water, they should preferably be formed of a non-rusting material, such as aluminum or stainless steel. Since aluminum is non-magnetic and most stainless steels are also non-magnetic, the use of these materials would obviate the magnetic problem. Similarly, the deflector 16 is also constantly exposed to water and should also be made of a non-rusting material. The use of aluminum and stainless steel would obviate both the rusting problem and the magnetic effects problem, as discussed above.

Returning to the method of use, once the watering device is suitably positioned, the deflector and/or the entire deflector/sprinkler combination is rotated until indexing arrow 30 is aligned with the north-pointing needle of the magnetic compass 26. The various peripheral fingers are now selectively bent upward or downward to produce a watering pattern that conforms to the shape and size of the lawn portion to be watered. This conforming procedure is repeated at each watering location, using a separate deflector for each location, and marking the deflector with a suitable identification at its identification area 32.

When the lawn is to be watered at some time in the future, the deflector identified with a particular location is positioned on the sprinkler at that location, its indexing arrow being aligned with the needle of its magnetic compass. Thus, that particular deflector will now automatically reproduce the desired conformed watering pattern, and the aligned index arrow and compass needle will assure that the conformed watering pattern matches the layout of the lawn portion.

While the foregoing explanation has been presented in terms of a single water jet type of sprinkler, it is readily apparent that other types of sprinklers may be used.

In some cases it may not be desirable to require the maintenance men to set up the magnetic arrangement previously discussed; it being preferable in such cases to have them merely place the watering apparatus at a preselected location. Several ways of achieving this result will now be discussed, these being based on the principle that preoriented and prepositioned locating devices are permanently implanted into the ground, the watering apparatus and/or the water deflector fitting these locating devices in a unique manner. In this way the mere placing of the watering apparatus in these locating devices automatically assures a conformed and matching water pattern.

Referring now to FIG. 4, there is shown an arrangement for holding and orienting the water deflector. This arrangement comprises a set — say three or more — locating devices 50a (only one being shown) that are positioned in a non-symmetrical configuration. As indicated, locating device 50a comprises a generally conical shape that is driven into the ground until its upper plate 52a is flush with the ground level, the anchoring portion 54a providing the desired anchorage. When suitably embedded, the set of small locating devices 50a is left in the ground as a permanent locating arrangement.

Locating device 50a contains a socket 56 for receiving one end of a mounting rod 20e that in turn holds, at its upper end, the water deflector 16. FIG. 4 shows the deflector-holding apparatus as a pair of nuts 58 that engage the threaded end of the rod 20e. A cross-sectional view of the rod 20e and its associated locating device 50a is shown in FIG. 5.

Thus, a set of three such mounting rods, suitably affixed to the water deflector, can be easily inserted into and removed from the set of locating devices, and will orient and hold the water deflector for the desired watering operation, the non-symmetry of the locating device pattern assuring that the water deflector is automatically properly oriented.

It will be noted that thus far the watering apparatus proper has not been involved, the above discussion having been directed to the placement and orientation of the water deflector. Since the watering apparatus is attached to a flexible water hose, it may now be positioned under the water deflector or, alternatively, it may first be positioned at the center of the locating device pattern and the deflector subsequently positioned as described above.

Thus, due to the use of the locating devices, the sprinkler and water deflector, as now positioned and oriented by the locating devices, produces a watering pattern that matches the layout of the area to be watered.

At other times it may be more desirable that the sprinkler and the water deflector be handled as a single unit, rather than being separable as described above. To achieve this result, the mounting rod 20e of FIG. 4, rather than being affixed to the water deflector 16 as described above, may form the legs of the sprinkler/deflector combination of FIG. 1, so that this combination is held, not by the embedded water pipe 12 of FIG. 1, but rather by the set of locating devices 50a of FIG. 4.

Another arrangement is illustrated in FIG. 6. This shows another locating device 50b having an upper plate 52b and a plurality (two in the illustration) of sharpened anchoring legs 54b. In using this device, it is driven into the ground until its upper plate 52b is flush with the ground surface, its plurality of anchoring legs 54b holding it in place. As in the previous discussion this locating device is also left permanently embedded in the ground. Upper plate 52b of FIG. 6 is indicated to have a substantially circular opening 60a having a small semi-circular cutout 62 (see FIG. 7), although the shape of both the opening and the cutout may be varied.

The lower part of the sprinkler shown in FIG. 6 now comprises a housing 22a that, instead of being fastened to an embedded water pipe, now takes the form of a spike that can be driven temporarily into the ground. Preferably, housing 22a is a rod or a tube whose cross-sectional shape is complementary to that of opening 60a and cutout 62, and is shown as rod having a circular cross-section and a longitudinal ridge 64 that fits into, and mates with, cutout 62. This mating ridge-and-cutout arrangement assures that when housing 22a is driven into the ground, it is properly oriented with respect to the locating device 50b, so that the previously conformed water pattern matches the lawn portion. Of course, other mating shapes may be used.

Since the housing 22a is not connected to an embedded water pipe, it now has a lateral threaded portion 66 for accepting the threaded portion 68 of a watering hose 70. Thus, the entire unitary watering apparatus may now be brought to the single permanently embedded locating device and when suitably oriented by means of the mating ridge and cutout, the desired watering pattern will result.

Under some conditions it may not be desirable to drive the relatively large spike previously discussed into the ground, because the holes produced thereby may be objectionable. To overcome this problem, attention is directed to the locating device 50c of FIG. 8. This also comprises an upper plate 52c, the locating device being driven into the ground until plate 52c is flush with the ground surface. FIG. 8 shows the anchoring legs 54c to take a somewhat different form than previously shown, although they provide the same anchoring function. Upper plate 54c contains a fairly large-sized opening 60b having a triangle-shaped cutout 62b. This locating device, as the others discussed, is also permanently embedded into the ground.

In this embodiment housing 22b terminates in a base plate 72 having a triangle-shaped projection 74, the base plate projection 72/74 mating with the upper plate opening cutout 60b/62b, as shown in FIG. 9.

Thus, as the base plate of the watering apparatus is mated to the permanently embedded locating device, the watering apparatus automatically assumes the desired orientation, the relatively large base plate and upper plate providing the desired stability.

In this way it is relatively easy to place and properly orient a movable watering apparatus by means of suitably positioned locating devices.

FIG. 10 is an illustration of the type of complex composite watering pattern that can be produced by this invention. In this illustration a first sprinkler/deflector combination 38 is shown to provide a watering pattern 40 having a rather complex periphery of straight lines, although a straight-line periphery is not to be considered as a limitation. It will be noted that one portion of the watering pattern 40 terminates in a "mating line" 42. A second sprinkler/deflector combination 44 is indicated to produce a watering pattern 46 that tends to have a curved periphery, although this, too, is not to be considered as a limitation. It will be noted that one portion of watering pattern 46 also terminates in a mating line (also 42 in the illustration), and that in the composite watering pattern 40/46 the mating lines correspond and coincide with each other. This arrangement minimizes over-saturation of the lawn, since no portion of the lawn is watered by both sprinklers. Of course, the mating line is not necessarily straight.

In the case of permanently embedded water pipes, the deflectors may be removed and then re-installed at their respective locations with their indexing marks and compass needles aligned, thus assuring that the watering pattern always conforms and matches the desired lawn portions.

It will be noted that in FIG. 10 the two watering devices 38 and 44 are used in slightly different ways, and this is done to further minimize the over-saturation problem. It will be apparent that if the watering patterns of the two watering devices overlap, the common overlapped area of the lawn will be over-watered. To help avoid this condition, watering device 38 is adjusted to provide an encircling watering pattern having a substantially straight mating line 42. The second watering device 44 is placed on the mating line and is set to "nod" or otherwise produce (depending on its type) a 180° coverage, with its desired conformed watering pattern. Thus, no appreciable area of the lawn is watered by both watering devices and the problem of over-saturation is further minimized.

SUMMARY

The disclosed invention has many advantages over prior art watering devices. First, it may be used with a large variety of presently available sprinklers. Second, it permits the watering pattern to be conformed to the shape and size of the lawn or lawn portion to be watered. Third, the use of the indexing mark and the needle of the magnetic compass permits the watering pattern to match the layout of the lawn or lawn portion every time that the lawn is to be watered. Fourth, the disclosed device is readily mounted onto already-installed sprinklers, with a minimum of difficulty. And finally, the disclosed device is simple and cheap to manufacture.

The disclosed arrangement may be used on a large lawn or on a small lawn, on a lawn that is square, rectangular, circular, or free-form, and it is particularly adapted for the watering of lawns that are bordered by walks or other area that should be kept dry.

Whereas the present invention has been shown and described herein in what is conceived to be the best mode contemplated, it is recognized that departures may be made therefrom within the scope of the invention which is, therefore, not to be limited to the details disclosed herein but is to be afforded the full scope of the invention.

I claim:

1. Apparatus for establishing a watering-pattern from a water spray that conforms to the shape of an area that is to be watered, comprising:

a conical sheet-metal deflector;

said deflector having controlling means for controlling the range of the water-spray in selected directions and thus conforming the watering-pattern to the shape of the lawn, said controlling means comprising a plurality of closely spaced radially-extending fingers adjacent the periphery of said deflector, said fingers to be bent for selectively interfering with the water-spray in selected directions;

said deflector further having a magnetic-compass mounted thereon at the external apex of said conical configuration;

indexing means affixed to said deflector, said indexing means to align with the polarized magnetic device of said magnetic-compass for orienting said deflector and causing said confirmed watering-pattern to match the layout of the lawn to be watered.

2. The combination of claim 2 including an identification-area on said deflector.

3. The combination of claim 1 wherein said deflector further has a plurality of mounting-apertures symmetrically positioned about the apex of said conical deflector;

means, comprising at least one mounting-bracket, for fastening said deflector on a water-sprinkler-whereby portions of said mounting-bracket(s) may be inserted into said mounting-apertures for holding said deflector.

4. In combination with a water-spray producing mechanism, the combination comprising:

a sheet-like water-deflector having a plurality of mounting-apertures;

means for mounting said water-deflector with its periphery in the path of said water-spray, said mounting means comprising:

a first substantially U-shaped mounting-bracket having its ends engaging selected ones of said mounting-apertures of said water-deflector, and having its central portion of said U-shape positioned adjacent one side of said water-spray producing mechanism, a second substantially U-shaped mounting-bracket having its ends engaging others of said mounting-apertures of said water-deflector, and having its central portion of said U-shape positioned adjacent the opposite side of said water-spray producing mechanism opposite the central portion of said first mounting-bracket; and means for fastening together said central portions of said mounting-brackets and said water-spray producing mechanism.

5. The combination of claim 4, wherein said water deflector has four mounting apertures, and the ends of said mounting brackets are notched to engage said mounting apertures.

6. Apparatus for producing a shaped watering pattern comprising:

a water deflector having radially positioned deflector fingers, said water deflector having a conical configuration to be located with its apex in the upward direction and directly above a water-spray producing mechanism, said conical configuration permitting selected deflector fingers to be positioned in the water spray for controlling the shape of the watering pattern, said conical configuration also simultaneously raising said apex to accommodate said water-spray producing mechanism;

means for mounting said water deflector relative to said water-spray producing mechanism, a magnetic compass attached to said deflector at the external apex of the conical configuration; and indexing means affixed to said deflector, said indexing means to align with the needle of said magnetic compass for orienting said deflector and causing said conformed watering pattern to match the layout of the lawn to be watered.

* * * * *